United States Patent
Wanda et al.

(10) Patent No.: US 8,014,007 B2
(45) Date of Patent: Sep. 6, 2011

(54) INFORMATION PROCESSING APPARATUS, SUBSTITUTE PRINT JOB MANAGEMENT METHOD, INFORMATION PROCESSING PROGRAM, AND RECORDING MEDIUM

(75) Inventors: Koichiro Wanda, Tokyo (JP); Noriyoshi Kurotsu, Tokyo (JP); Masamichi Ohshima, Tokyo (JP); Hidekazu Morooka, Tokyo (JP); Takashi Yagita, Tokyo (JP); Koji Kikuchi, Tokyo (JP); Kei Kitagata, Tokyo (JP); Hiroyuki Kayama, Tokyo (JP); Kenichi Shirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 11/005,363

(22) Filed: Dec. 6, 2004

(65) Prior Publication Data

US 2005/0128514 A1 Jun. 16, 2005

(30) Foreign Application Priority Data

Dec. 10, 2003 (JP) ................................. 2003-412210

(51) Int. Cl.
*G06K 15/00* (2006.01)
(52) U.S. Cl. ...................... 358/1.14; 358/1.13; 358/1.15
(58) Field of Classification Search .................. 358/1.14, 358/1.15, 1.13, 1.16
See application file for complete search history.

(56) References Cited

U.S. PATENT DOCUMENTS

| | | | | |
|---|---|---|---|---|
| 5,706,411 A * | 1/1998 | McCormick et al. | ........ | 358/1.14 |
| 6,434,589 B1 * | 8/2002 | Lin et al. | ........................ | 718/100 |
| 6,474,881 B1 * | 11/2002 | Wanda | ............................ | 400/61 |
| 6,963,416 B2 * | 11/2005 | Tuchitoi et al. | ............... | 358/1.14 |
| 7,221,465 B1 * | 5/2007 | Shimada | ........................ | 358/1.14 |
| 7,426,046 B2 * | 9/2008 | Shirai et al. | .................. | 358/1.13 |
| 7,593,125 B2 * | 9/2009 | Wang et al. | ................... | 358/1.15 |
| 2001/0053301 A1 * | 12/2001 | Nishii | .............................. | 400/63 |
| 2002/0085850 A1 | 7/2002 | Nakata et al. | | |
| 2002/0131069 A1 * | 9/2002 | Wanda | .......................... | 358/1.14 |
| 2003/0007819 A1 | 1/2003 | Wanda | | |
| 2003/0174359 A1 | 9/2003 | Gomi | | |

FOREIGN PATENT DOCUMENTS

| | | |
|---|---|---|
| EP | 0996055 A2 | 4/2000 |
| JP | 07-225660 A | 8/1995 |
| JP | 07-225660 A1 | 8/1995 |
| JP | 2002-116892 A | 4/2002 |

* cited by examiner

*Primary Examiner* — Twyler L Haskins
*Assistant Examiner* — Dennis Dicker
(74) *Attorney, Agent, or Firm* — Canon USA Inc IP Division

(57) ABSTRACT

In a print system including a print server and a plurality of printers, when the occurrence of a failure in a first printer is detected, the print job to be processed first from among the print jobs accumulated in the first printer is identified as the first print job. Print jobs other than the first print job in the first printer are transferred to a second printer, and then deleted from the first printer.

15 Claims, 16 Drawing Sheets

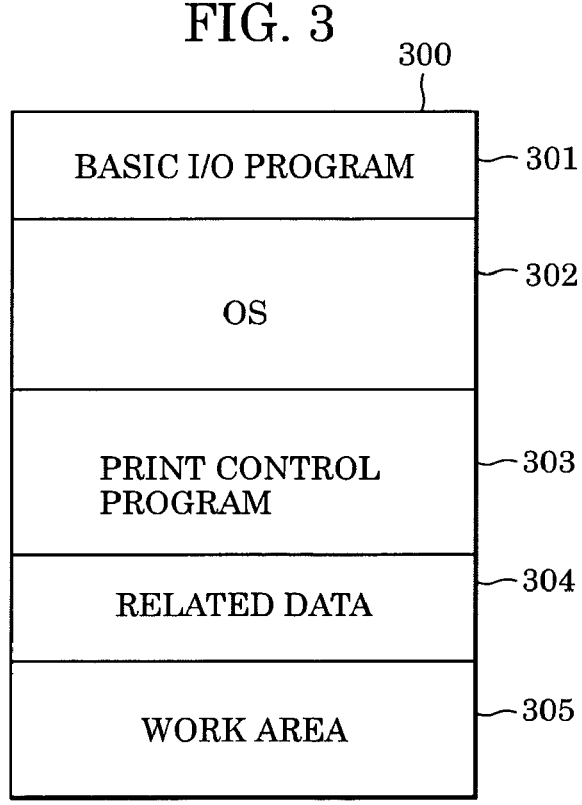
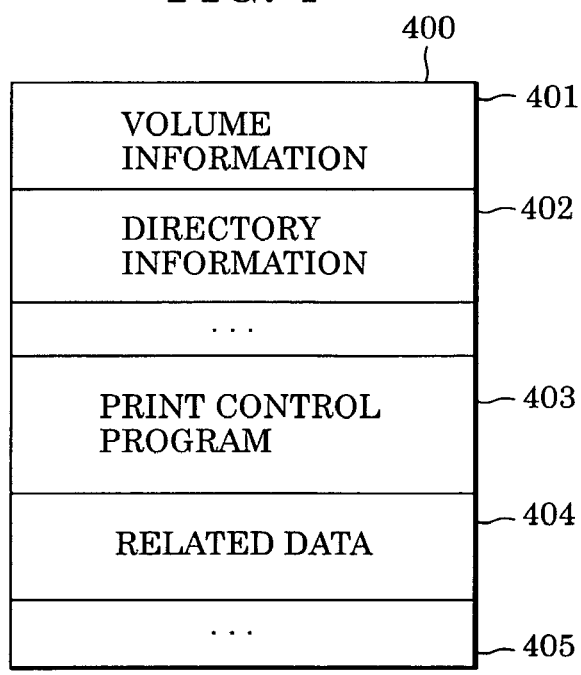

FIG. 10

| JOB ID |
|---|
| PRINTER NAME |
| MACHINE NAME |
| STATUS |
| DOCUMENT NAME |
| SIZE |
| ⋮ |
| ⋮ |
| JOB HANDLE |
| FIRST JOB MARK |
| ⋮ |
| ⋮ |

FIG. 11

| JOB HANDLE |
|---|
| STATUS |
| PRINTER NAME |
| ⋮ |
| ⋮ |

FIG. 13

| HANDLE | STATUS |
|--------|--------|
| 0001 | EXECUTION IN PROGRESS |
| 0002 | EXECUTION IN PROGRESS |
| 0003 | EXECUTION IN PROGRESS |
| 0004 | WAITING FOR EXECUTION |

FIG. 14

| HANDLE | STATUS |
|--------|--------|
| 0011 | DELETION IN PROGRESS |
| 0012 | EXECUTION IN PROGRESS |
| 0013 | EXECUTION IN PROGRESS |
| 0014 | WAITING FOR EXECUTION |

FIG. 15

```
┌─────────────────────────────────────────────────────────────┐
│ ADD PRINTER                                             [x] │
│                                                             │
│  PRINTER NAME: [                                         ]  │
│    PORT NAME:  [                                         ]  │
│                          [ SELECT PORT... ] [  PROPERTY  ]  │
│  DRIVER NAME:  [                                         ]  │
│ OUTPUT METHOD: [ AUTOMATIC SUBSTITUTION ▼] [ SELECT DRIVER ]│
│ BACKUP PRINTER LIST:                                        │
│  ┌─────────────────────────┐                                │
│  │                         │                                │
│  │                         │  [ SET BACKUP PRINTER... ]     │
│  └─────────────────────────┘                                │
│  ┌─ PRINTER OPTION ──────────────────────────────────────┐  │
│  │ JOB PRIORITY:    [ 1  ⇅]  (1~99)                      │  │
│  │ CONDITION FOR    [✓] ERROR OCCURRED                   │  │
│  │ TRIGGERING       [ ] PORT DISABLED                    │  │
│  │ SUBSTITUTION:    [ ] NO. OF PRINT JOBS IN   [    ] OR MORE │
│  │                      QUEUE                            │  │
│  │                  [ ] SIZE OF PRINT JOBS IN  [    ] KB OR  │
│  │                      QUEUE                         MORE │  │
│  │ CONDITION FOR SWITCHING TO                            │  │
│  │ MANUAL SUBSTITUTION:                                  │  │
│  │              [ ] PAPER OUT                            │  │
│  │              [ ] PAPER JAM                            │  │
│  │              [ ] COVER/DOOR OPEN                      │  │
│  │              [ ] TRAY FULL                            │  │
│  │              [ ] FIRST JOB IN DEVICE  ← S1501         │  │
│  └───────────────────────────────────────────────────────┘  │
│                           [  OK  ] [ CANCEL ] [  HELP  ]    │
└─────────────────────────────────────────────────────────────┘
```

INFORMATION PROCESSING APPARATUS, SUBSTITUTE PRINT JOB MANAGEMENT METHOD, INFORMATION PROCESSING PROGRAM, AND RECORDING MEDIUM

BACKGROUND OF THE INVENTION

1. Field of the Invention

The present invention relates to a substitute printing technology.

2. Description of the Related Art

In the known art, if a printing apparatus experiences a failure that disables it from outputting print jobs and the print jobs need to be printed by a substitute printing apparatus, all print jobs that have been transmitted to the failing printing apparatus from the host computer and whose execution in the printing apparatus has not been confirmed are printed by the substitute printing apparatus, as described in Japanese Patent Laid-Open No. 07-225660. However, a substitute printing method where the copies of all print jobs held in the host computer are transmitted to a substitute printing apparatus has a problem such that the print jobs that have already been transmitted to the failing printing apparatus are also printed out by the substitute printing apparatus.

Some printing apparatuses have a function for deleting the received print jobs in the host computer if a failure occurs. Nevertheless, some pages of a print job that is suspended due to a failure in the printing apparatus are inevitably printed in duplicate by the substitute printing apparatus even if the pages have already been printed by the failing printing apparatus.

SUMMARY OF THE INVENTION

It is an aspect of the present invention to carry out substitute printing while preventing duplicate printing.

According to an aspect of the present invention, an information processing apparatus which can communicate with a plurality of printing apparatuses includes a detection unit configured to detect the occurrence of an event in a first printing apparatus, the event disabling the first printing apparatus from printing, an identification unit configured to identify a first print job which is to be processed first from among a plurality of print jobs accumulated in the first printing apparatus, a substitution unit configured to cause a second printing apparatus to perform substitute printing of at least one of the plurality of print jobs, except for the first print job, and a deletion unit configured to delete the at least one of the plurality of print jobs, except for the first print job, from the first printing apparatus.

According to another aspect of the present invention, a print job management method for managing a print job in a printing apparatus includes detecting the occurrence of an event in a first printing apparatus, the event disabling the first printing apparatus from printing, identifying a first print job which is to be processed first from among a plurality of print jobs accumulated in the first printing apparatus, causing a second printing apparatus to perform substitute printing of at least one of the plurality of print jobs, except for the first print job, and deleting the at least one of the plurality of print jobs, except for the first print job from the first printing apparatus.

According to still another aspect of the present invention, computer-executable process steps for causing a computer to execute a print job management method for managing a print job in a printing apparatus includes detecting the occurrence of an event in a first printing apparatus, the event disabling the first printing apparatus from printing, identifying a first print job which is to be processed first from among a plurality of print jobs accumulated in the first printing apparatus, causing a second printing apparatus to perform substitute printing of at least one of the plurality of print jobs, except for the first print job, and deleting the at least one of the plurality of print jobs, except for the first print job from the first printing apparatus.

According to still another aspect of the present invention, a computer-readable recording medium stores the above-described computer-executable process steps for causing a computer to execute a print job management method for managing a print job in a printing apparatus.

With this characteristic structure, appropriate substitute printing is enabled while duplicate printing is prevented.

Other features and aspects of the present invention will be apparent from the following description taken in conjunction with the accompanying drawings, in which like reference characters designate the same or similar parts throughout the figures there.

BRIEF DESCRIPTION OF THE DRAWINGS

FIG. 3 is a diagram showing one example of the memory map of the RAM shown in FIG. 2.

FIG. 4 is a diagram showing one example of the memory map of the floppy disk shown in FIG. 2.

FIG. 10 is a diagram showing one example of print job management information in a server according to an embodiment.

FIG. 11 is a diagram showing one example of print job management information acquired from a printer by a server according to an embodiment.

FIG. 13 is a list of print jobs according to an embodiment.

FIG. 14 is a list of print jobs according to an embodiment.

FIG. 15 is a diagram showing one example of a setting screen for setting conditions for switching from automatic substitution to manual substitution according to an embodiment.

DESCRIPTION OF THE EMBODIMENTS

An exemplary embodiment of the present invention will now be described in detail with reference to the drawings. It should be noted that the relative arrangement of the components, the numerical expressions and numerical values set forth in these embodiments do not limit the scope of the present invention unless it specifically stated otherwise.

In this specification, the term "print data" indicates image data expressed in, for example, a page description language (PDL), and the term "print job information" indicates various types of attribute information regarding a print job, including the name of the document to be printed, the ID of the print job, the printer from which the print data is output, a location where the print data is stored, information regarding the printing method, etc. Furthermore, the term "print job" indicates a combination of print data and print job information.

<System Structure>

Figure 1:
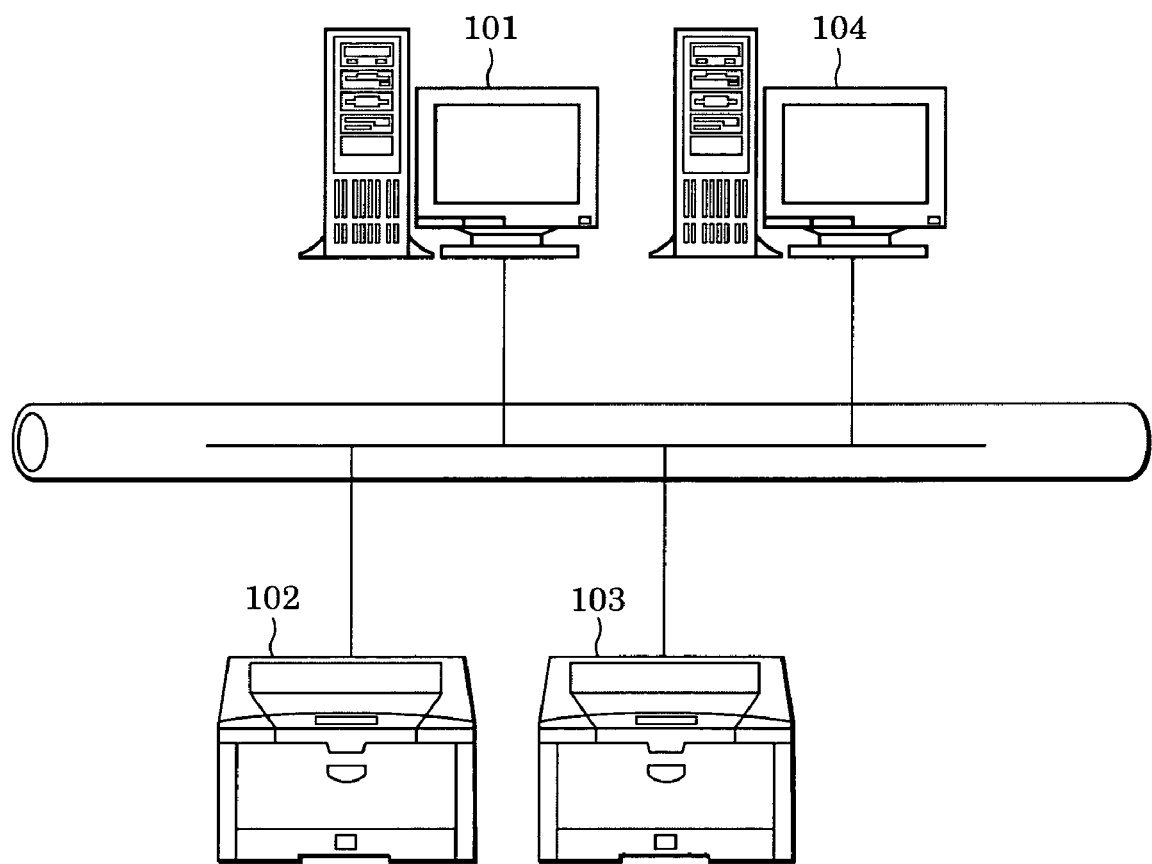
FIG. 1 is a block diagram showing the overall structure of a print system according to an embodiment.

FIG. 1 is a block diagram showing the overall structure of a print system according to an embodiment of the present invention. This print system includes a print server 101, which is an information processing apparatus, network printers 102 and 103 functioning as printing apparatuses, and a client 104. The server 101, the network printers 102 and 103, and the client 104 are interconnected to one another to construct a network.

The print server 101 includes an executable print control program having functions for managing the network printers 102 and 103 included in the print system, accumulating files used on the network, monitoring the network operation status, etc. More specifically, the print server 101 has a function for generating a print job and transferring it to the network printers 102 and 103. The print server 101 is not necessarily a computer specialized in managing printers, and can be realized by a general-purpose computer provided with a print management function. The print server 101 may also function as a client of another computer.

Each of the network printers 102 and 103 is a print device serving as a physical apparatus that receives a print job, including print data from the print server 101, and analyzes and prints out the received print job. The network printers 102 and 103 can be realized by any type of printing apparatuses, such as laser beam printers employing an electrophotographic method, ink-jet printers employing an ink-jet method, printers employing a thermal transfer method, etc.

Communication between the apparatuses included in the present print system may be realized by wired communication, based on, for example, an Ethernet® cable, or wireless communication based on, for example, radio waves or light waves.

<Structures of Print Server and Client>

Figure 2:
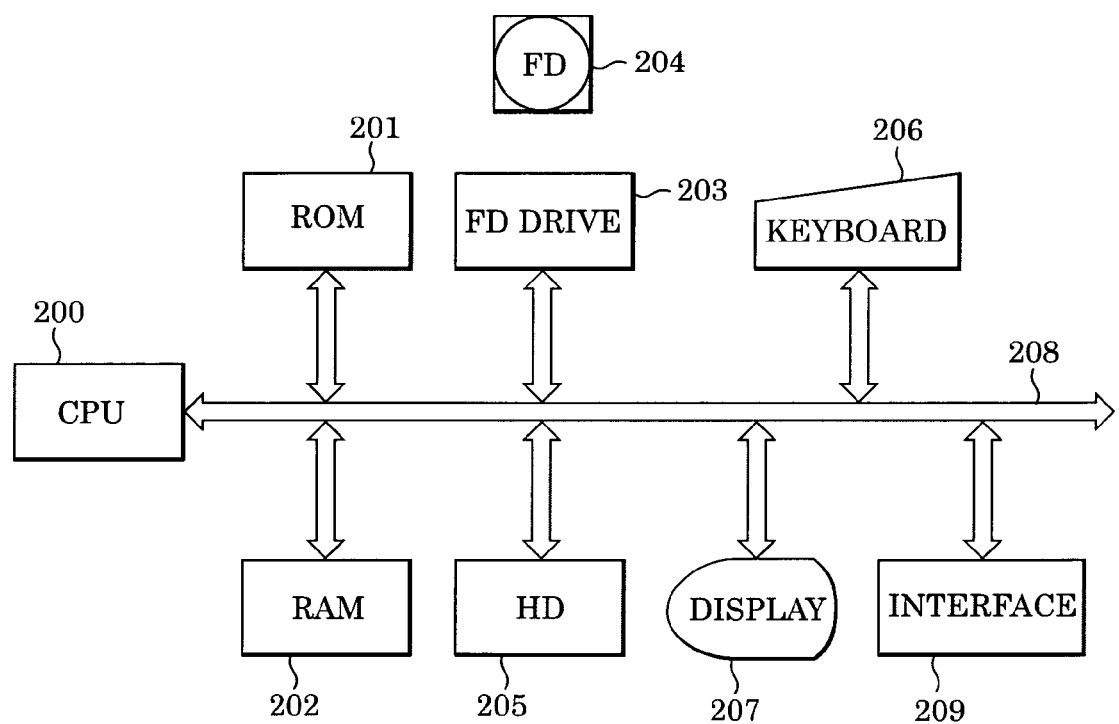
FIG. 2 is a block diagram showing the hardware structure of a server or a client.

FIG. 2 is a block diagram for describing the hardware structure of the print server 101 shown in FIG. 1.

Referring to FIG. 2, a Central Processing Unit (CPU) 200 is control means for loading an application program, a printer driver program, an operating system (OS), a print control program, etc. stored in a hard disk (HD) 205 to execute these programs. In addition, CPU 200 controls temporary storage of information and files required to execute these programs into a RAM 202.

A ROM 201 is storage means for storing various types of data including a program such as a basic I/O program, font data used for document processing, template data, etc. The RAM 202 is temporary storage means functioning as main memory, work area, etc. for the CPU 200.

A floppy disk (FD) drive 203 is recording-medium read-in means, to be described below, for loading, into the present computer system, a program stored on an FD 204 functioning as a recording medium. The print server 101 may include other recording-medium read-in means, instead of or in addition to the FD drive 203. Other recording media may be realized by any type of computer-readable recording media including a CD-ROM, a CD-R, a CD-RW, a PC card, a DVD, an IC memory card, an MO, a memory stick, etc.

The HD 205 is external storage means functioning as a large capacity memory for storing an application program, a printer driver program, an OS, a print control program, a related program, etc. Furthermore, a spooler, functioning as spool means, is stored in the HD 205. A server spooler is stored as spool means in the print server 101, whereas a client spooler is stored as spool means in the client 104.

A keyboard 206 is input means for enabling a user to enter, for example, a device control command to the print server 101.

A display 207 is display means for displaying, for example, a command entered on the keyboard 206 and the statuses of printers 102 and 103. A system bus 208 controls data flow in the computer functioning as the print server 101.

An interface 209 is input/output means for enabling the print server 101 to interchange data with another apparatus on the network.

<Description of Memory Map and Related Information>

FIG. 3 is a diagram showing one example of the memory map of the RAM 202 shown in FIG. 2, where an executable print control program is loaded into the RAM 202. More specifically, an area 301 stores the basic I/O program, which is a program with an initial program loading (IPL) function for starting up the operation of the OS loaded from the HD 205 into the RAM 202 when an apparatus, such as the printer server 101 or the client 104, is powered on. An area 302 stores the OS, an area 303 stores the print control program, and an area 304 stores related data. An area 305 is a work area used by the CPU 200 to execute various types of programs.

Figure 5:
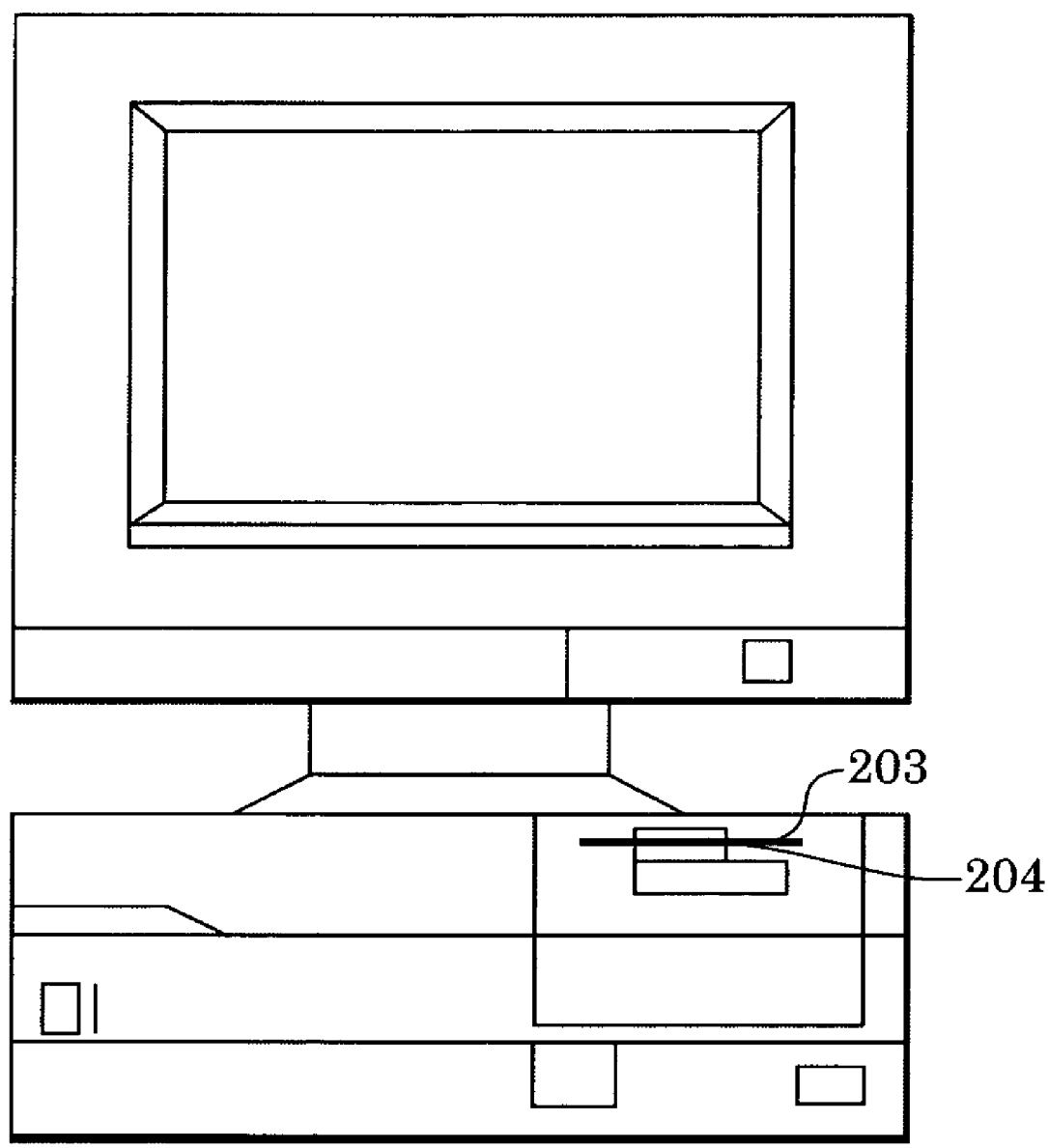
FIG. 5 is a diagram showing the floppy disk drive holding the floppy disk shown in FIG. 2.

There are several methods for loading or installing the print control program and the related data into RAM 202. For example, the print control program and the related data may be pre-installed from the FD 204 to the HD 205 and then loaded from the HD 205 into the RAM 202. FIG. 5 is a diagram showing the FD drive 203 holding the FD 204, where the FD 204 contains the print control program and the related data. The print control program and the related data may also be loaded directly from the FD 204 into the RAM 202.

The print control program need not always be loaded from a FD 204. For example, the print control program may be stored in the ROM 201 such that it constitutes part of the memory map 300 so that it can be executed directly by the CPU 200. In addition, software for realizing the functions equivalent to the above described hardware units may be used in place of the hardware units.

The print control program may include two modules, one being installed in a client 104 and the other installed in a print server 101. The print control program in the client 104 performs control for issuing a command for changing the print destination of a print job or the print order. On the other hand, the print control program in the print server 101 controls the order of print jobs, reports that printing of a print job is completed, and issues a request for changing the print destination, etc.

In another implementation, one computer may have both modules, so as to perform pseudo parallel processing where the two modules are executed simultaneously or in a time-sharing manner. In still another implementation, a single print control program may function differently depending on the environment in which it is executed; e.g., the print control program functions for a client in some cases and for a print server in other cases.

FIG. 4 is a diagram showing one example of the memory map 400 of the FD 204. The memory map 400 includes volume information 401 indicating the information regarding the data, directory information 402, a print control program 403, and related data 404.

<Software Configuration of Print System>

The software configuration of the print system of the present invention will now be described. It is included in the above-described print control program.

The software of the present invention may run in a single print server that is realized by one host computer or in a plurality of host computers spanning a print system. Furthermore, although the present embodiment is described by way of one print server, the present invention is not limited to a server spool method where a print job is spooled in a server machine but is applicable to a client spool method where a host computer, as a client machine, in the print system holds a print job and under the control of print job scheduling by the server machine, transmits the print job to a printer.

An exemplary embodiment of the present invention will now be described more specifically with reference to FIG. 6A, which depicts an example of the software configuration in the print server 101. The arrows between components illustrate the manner in which a print job, including the drawing command issued from an application, is processed. Furthermore, the software component indicated by each block is executed by the CPU 200.

In general, a typical application program 601, such as Microsoft Word®, generates a series of drawing commands via the OS when it receives a print command from the user. Each of the drawing commands generated via the OS is passed to PDL drivers 602, each of which then generates a print job, including a PDL file interpretable by the network printers 102 and 103 based on the series of drawing commands. The print job is then passed to a spooler 603. Although a PDL driver is used in the current description, the present invention is not limited to a PDL driver, and any printer driver that generates, for example, Band Description Language (BDL) data or compressed bit-map data, is applicable.

The spooler 603 follows a procedure for passing the print job to a job control port monitor 604 (arrow a) selected and specified by the user via a user interface (not shown) and transmitting the print job to the network printers 102 and 103. The following description presumes that the user issues the print command with a specification of the job control port monitor 604 for substitute printing. Print setting information, such as paper size and stapling, which is set via a printer driver interface (not shown), is also transmitted to the job control port monitor 604.

The job control port monitor 604 transmits the print job to a job control print service 605 (arrow b) for substitute printing. The job control print service 605 manages the status of the transferred print job and the device status. In particular, when a network printer and the data transfer source are connected via a peer-to-peer interface to deliver the print job directly to the network printer, the job control print service 605 manages information, such as the device status and print job status reported from the network printer, and issues a predetermined command to the network printer. This function of the job control print service 605 corresponds to a function for managing device information and print job information of the network printers 102 and 103.

The job control print service 605 holds a copy of the print job based on the function for substitute printing of the print job and transfers the print job to either the network printer 102 or the network printer 103 (arrows c or d).

A print manager 609 enables a user to check the status of the print job in the job control print service 605 and provides a user interface for operating the print job. The print manager 609 exchanges information and commands with the job control print service 605 via the software interface, i.e., Application Program Interface (API) of the job control print service 605.

The main function of the print manager 609 is to acquire, as an event, the status information of the network printers 102 and 103 managed by the job control print service 605. The types of event notifications include a warning indicating a low toner condition, errors/warnings such as a failure in communication between the device and the client, insufficient memory, and paper output tray full of paper, and normal information reported at the time recovery from an error state to a normal state occurs. The job control print service 605 in this case has a function for monitoring the status of each network printer that can be communicated with via the network, such as power control status and failure information, e.g., paper jam, while printing is in progress in the network printer.

In more detail, the job control print service 605 monitors the status of a device based on an event, including the specification of the device, that has been received from the print manager 609, and reports the result of the monitoring to the print manager 609.

A management console 610 exchanges information and commands with the job control print service 605 via the API to monitor the entire system of the server 101 or the client 104. In addition, the print manager 609 communicates with the network printers 102 and 103 using a device information control module 606 to obtain information regarding a print job as well as operational status of each printer.

In the case where a print function is provided in the standard configuration of a general-purpose operating system and is to be used without a substitute printing function, a PDL file generated in the PDL printer driver 602 is transferred from the spooler 603 to either the network printer 102 or the network printer 103 (arrow f) via a job control port monitor 608 (arrow e).

A modification of the system described with reference to FIG. 6A will now be described with reference to FIG. 6B. FIG. 6B illustrates the client 104 and the print server 101 that realize a substitute printing function by sharing the function in cooperation with each other. More specifically, FIG. 6B shows the data flow in a case where the print server 101 schedules print job information that has been generated by the client 104 and registered in a print queue. The components FIG. 6B has in common with FIG. 6A are denoted with the same reference numerals used in FIG. 6A.

Figure 6A:
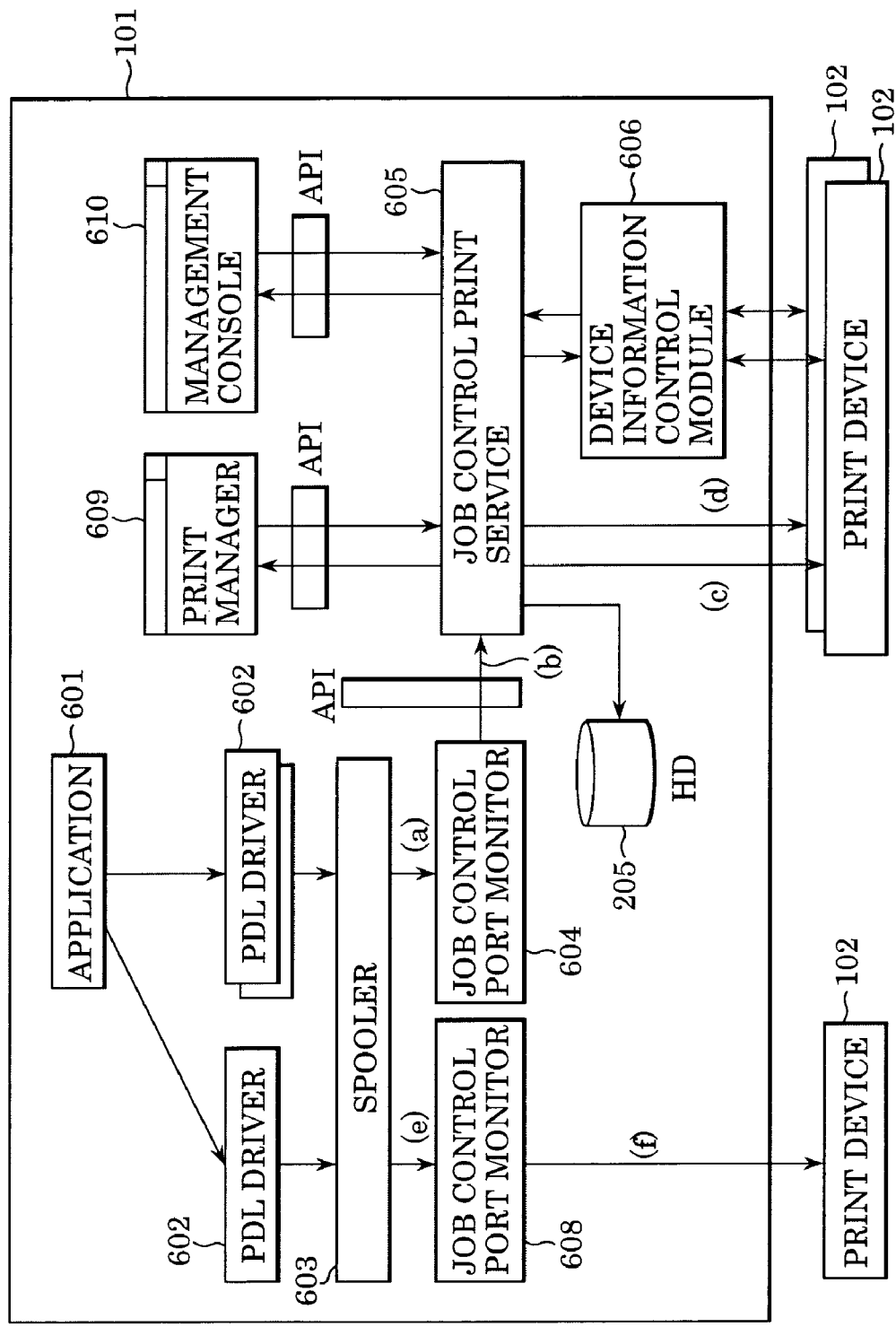
FIG. 6A is a diagram showing one example of the software configuration in a print system.
Figure 6B:
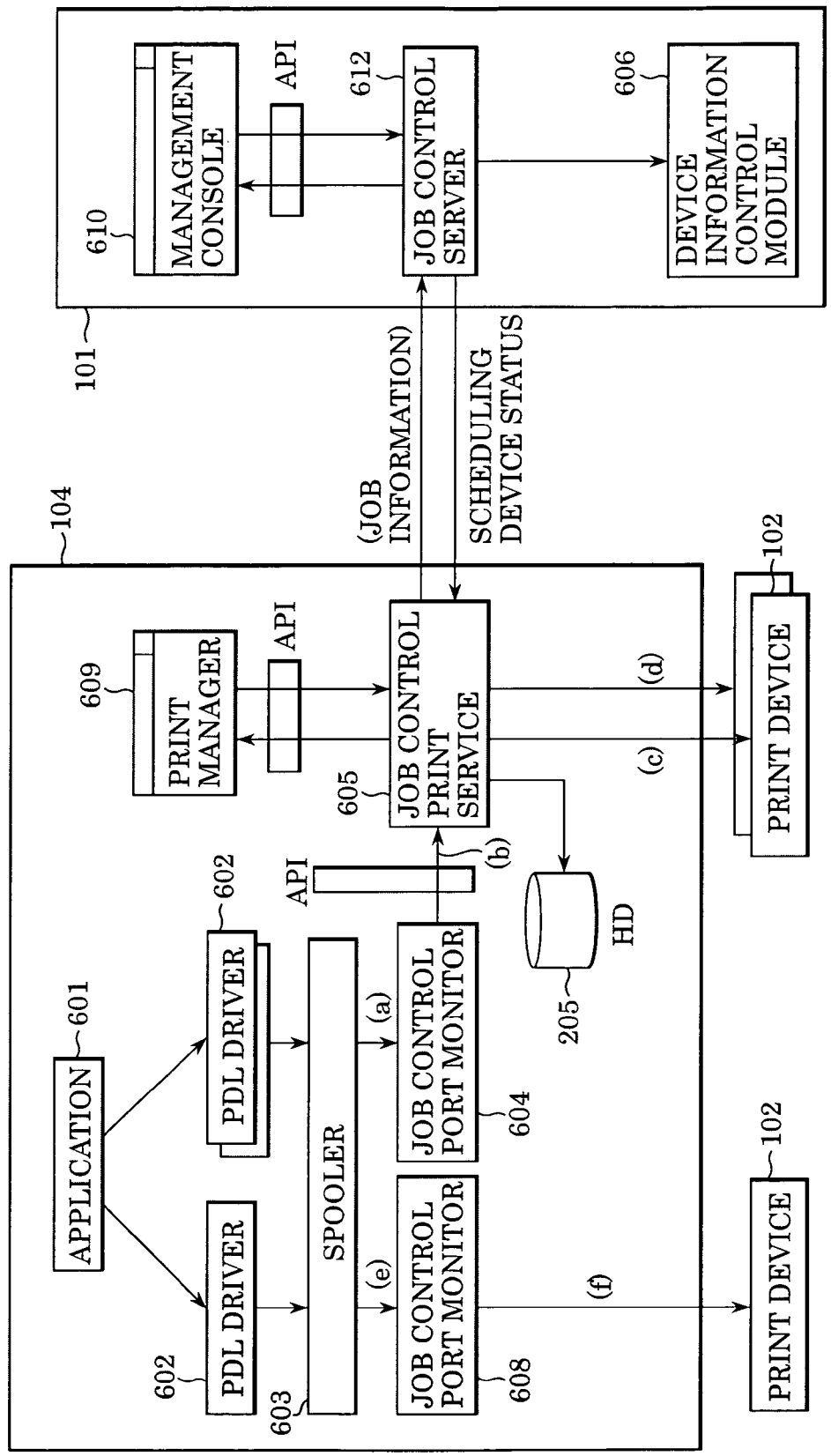
FIG. 6B is a diagram showing another example of the software configuration in the print system.

In the system shown in FIG. 6B, the client 104 contains all of the components of the print server 101 depicted in FIG. 6A, except for the management console 610 and the device information control module 606. The print server 101 contains the management console 610 and the device information control module 606 in FIG. 6B. In addition, the print server 101 also contains a job control server 612.

The print server 101 communicates with the network printers 102 and 103 using the device information control module 606, and obtains information regarding a print job and the operational status of each printer. The obtained information is then passed to the job control print service 605 in the client 104. The job control server's 612 function is equivalent to the job control print service 605, and therefore, the job control server 612 shares the print job information with the job control print service 605.

The software configuration of the present invention's print system is not limited to that illustrated in FIG. 6A or FIG. 6B, and the present invention can be realized with other various software configurations. For example, the client 104 can include the application 601, PDL drivers 602, spooler 603, and job control port monitors 604, 608, while the server 101 includes the job control print service 605, the print manager 609, the management console 610, and the device information control module 606.

<Flow of Processing in Case of Failure during Printing>

The flow of processing if a failure occurs during printing in the print system of the present invention will now be described with reference to the sequence diagram depicted in FIG. 7 and the flowcharts shown in FIGS. 8 and 9.

Figure 7:
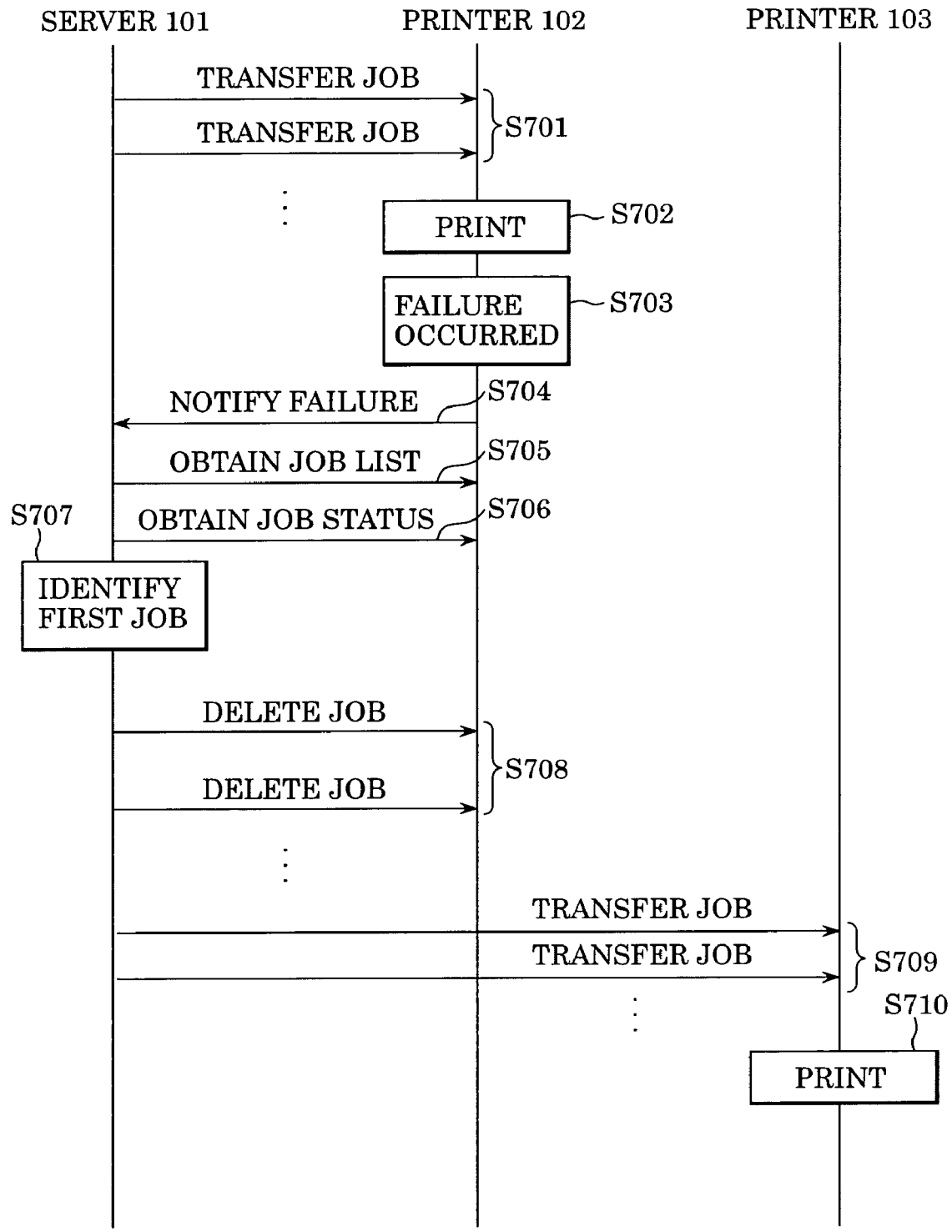
FIG. 7 is a sequence diagram showing the flow of processing for substitute printing.

FIG. 7 is a diagram depicting one example of processing between the print server 101 and the printers 102, 103.

The print server 101 transmits a print job received from the application software 601 to the printer 102 according to a user's instruction (S701). On receiving the print job, the printer 102 begins printing the print job (S702). In this case, the printer 102 holds a plurality of print jobs, and if a failure, such as a paper jam, occurs in the printer 102 before printing is completed (S703), the print server 101 is informed of the failure from the printer 102 by means of event notification or polling by the print server 101 to the printer 102 (S704). Upon notification of the failure, the print server 101 acquires a list of print jobs held in the printer 102 (S705). The print job list is acquired either by the print server 101 issuing a request to the printer 102 or by the printer 102 automatically providing the list to the print server 101 after the event notification. Although the present embodiment describes a paper jam triggering notification of a failure that disables the printer 102 from printing, failure notification according to the present invention is not limited to a paper jam. Any failure that results in the printer 102 not being able to print would trigger notification of a failure that has disabled the printer. For example, paper out, cover/door open, paper output tray full, etc.

In addition, as shown in FIG. 15, some events that disable printing can be set by a user. For example, a disabled output port supported by the job control print service 605, the number of print jobs held in the queue of the printer 102 exceeding a predetermined number, and the size of a single or a plurality of print jobs in the queue exceeding a predetermined size. Furthermore, the statuses of such events that cause printing to be disabled are acquired by the job control print service 605 via status event notification from the printer 102 or polling by the job control print service 605.

Referring back to FIG. 7, the list of print jobs includes, for example, a handle for managing a print job in the printer 102 and controlling the print job from another device. The handle uniquely identifies the print job and thereby can be used to operate, e.g., to delete, the print job. Next, the print server 101 acquires the print job status of each print job in the printer 102 (S706). The list acquired in this case is as shown in, for example, FIGS. 13 and 14. The print server 101 identifies the print job to be processed first by the printer 102 as the first print job based on the list of print jobs provided with print job statuses in the printer 102 (S707). In this case, the lists in FIGS. 13 and 14 include print jobs issued from a plurality of job control print services 605. From among the acquired list, each of the job control print services 605 identifies the print jobs issued by itself according to the print job management function. More specifically, each job control print service 605 discriminates the print jobs issued by itself from print jobs issued by other job control print services 605 by detecting the handles (added by the printer device) of the print jobs as shown in FIGS. 13 and 14, where the handles match the job handle (job identification information) included in the print job management information.

The print job management information is a collection of predetermined management information items of as many print jobs as issued by the job control print service 605 itself, as shown in FIG. 10. For example, in FIG. 7, each job control print service 605 determines whether or not a print job issued by itself is the first print job in the list based on the acquired list and the print job management information. The acquisition of the list in step S705 and the print job status in step S706 can be carried out together. This option also applies to steps S802 and S804 in FIG. 8 as described below.

If the handle of the print job determined as the first print job in the print jobs included in the acquired list shown in FIG. 13 or 14 is included in the handles of the print jobs managed by the job control print service 605 itself, the print server 101 marks the print job corresponding to the handle to identify it as the first print job in the print job management information of the print server 101, and issues a command for deleting the print jobs that have been sent to the failing printer 102, except for the first print job (S708). The print server 101 then transfers, to the substitute printer 103, the copies of the print jobs deleted in the printer 102 (S709) and substitute printing is carried out (S710). Selecting the substitute printer 103 and what trigger to use to start substitute printing are not limited to a particular method or condition. Any criterion for selecting a substitute printer and starting substitute printing can be used.

In a typical printing apparatus which, when a plurality of print jobs are received, starts the processing (e.g., interpretation of PDL, Job Language, development of image data on the first page, etc.) of print jobs subsequent to the first print job before paper eject of the first print job is completed, the statuses of print jobs in the device acquired from the host computer only indicate that a plurality of print jobs are being processed. In other words, in a typical printing apparatus, a status alone is not sufficient to identify print jobs for which the print engine is still working and for which paper eject has not been completed. According to the sequence diagram in FIG. 7, this problem is overcome by acquiring a list in S705, and based on this list identifying the first print job.

<Flow of Processing in Case of Failure after Delete Command is Issued>

Figure 12:
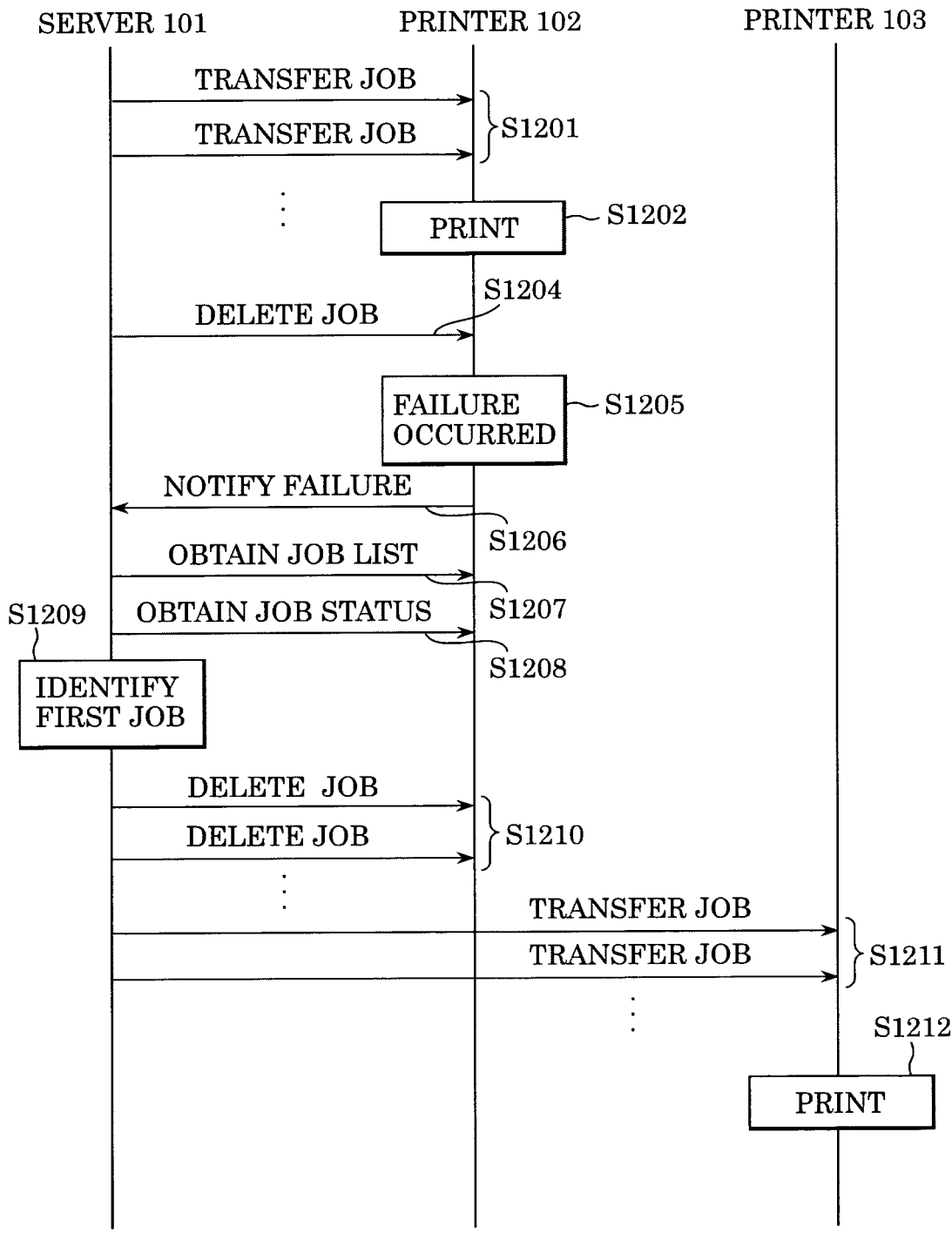
FIG. 12 is a sequence diagram showing the flow of processing for substitute printing according to an embodiment.

The flow of processing by the print system of the present invention if a failure occurs after the delete command has been issued will now be described with reference to the flowchart in FIG. 9 and the sequence diagram in FIG. 12. FIG. 12 depicts a procedure between the print server 101 and printers 102 and 103 for substitute printing according to the present invention.

The print server 101 transmits a print job received from the application software 601 to the printer 102 according to a user's instruction (S1201). Upon receiving the print job, the printer 102 begins printing the print job (S1202). If a command for deleting the print job currently being printed is issued according to a user's instruction or an instruction from another system (S1204), and if a failure, such as a paper jam, occurs in the printer 102 (S1205) before the deletion of the print job is completed, then the print server 101 is informed of the failure by the printer 102 via event notification or polling from the print server 101 to the printer 102 (S1206).

The print server 101 then acquires a list of the print jobs held in the printer 102 from the printer 102 (S1207). The print server 101 then acquires the print job status of each print job in the printer 102 (S1208). The acquisition of the list in step S1207 and the print job status in step 1208 can be carried out together. This option also applies to steps S802 and S804 in FIG. 8 to be described later.

Next, the print server 101 identifies the first print job in the print job list. In this case, since a delete command has been issued to delete the print job to be processed first just before a failure occurs in the printer 102, the print job being deleted, even if located at the top of the list, is not identified as the first print job. If the handle of the print job determined as the first of the print jobs included in the acquired list, as shown in FIG. 14, corresponds to the handle of a print job issued by the job control print service 605 itself, the print job to be processed first of the print jobs, except for the print job currently being deleted, is identified as the first print job (S1209).

When the print job that has been identified as the first print job is marked in the print job management information of the print server 101, the command for deleting the print jobs that have been sent to the failing printer 102, except for the first print job, is issued (S1210). The print server 101 then transfers to the substitute printer 103, the copies of the print jobs deleted in the printer 102 (S1211) and substitute printing is carried out (S1212). If, on the other hand, the handle of the print job to be processed first, except for the print job being deleted, does not correspond to the handle of a print job issued by the job control print service 605 itself but does correspond to the handle of a print job issued by another job control print service 605, in the above-described step S1210 the processing of adding a mark to the predetermined print job in the print job management information is not carried out.

<Processing at Print Server>

Figure 8:
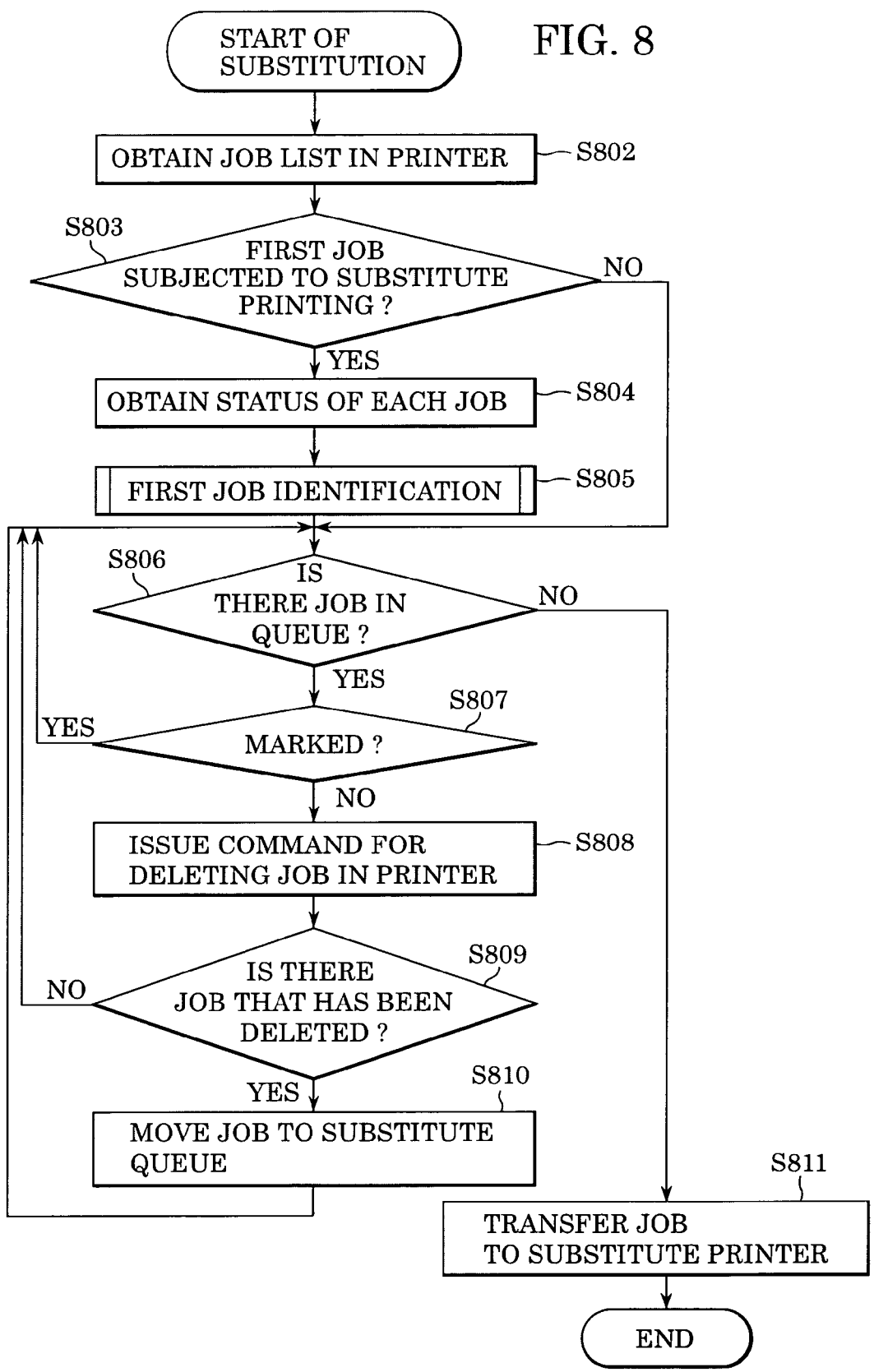
FIG. 8 is a flowchart showing the flow of processing for substitute printing by a server according to an embodiment.
Figure 9:
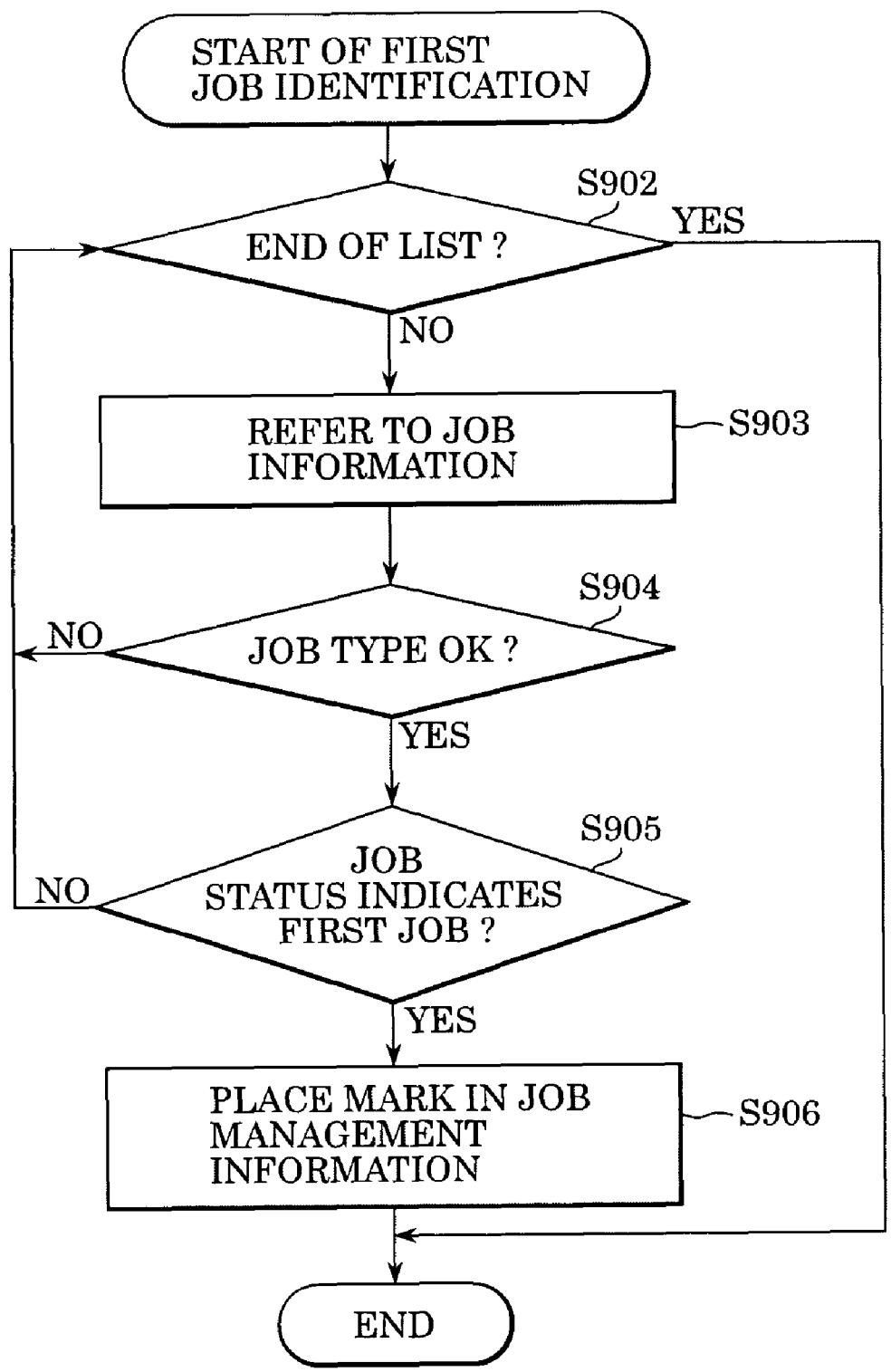
FIG. 9 is a flowchart showing the flow of processing for identifying the first print job by a server according to an embodiment.

FIG. 8 is a flowchart showing substitute printing by the print server 101. After the print server 101 transfers a print job to the printer 102, if the print server 101 detects the occurrence of a failure in the printer 102 before confirming the completion of the print job, the print server 101 starts substitute print processing.

In step S802, a list of print jobs in the printer 102 where a failure has occurred is acquired. This list includes identifiers (handles) assigned to manage print jobs in the printer 102. As described above, FIGS. 13 and 14 are examples of the list of acquired print jobs.

In addition, the print server 101 can identify a print job issued by itself from among the list of print jobs acquired from the printer 102 by pre-embedding in the print job, the print job information managed by the print server 101 and a print job identifier (handle) generated and managed by the print server 101, delivering the print job to the printer 102, and acquiring again both the identifier (handle) managed by the print server 101 and the print job identifier (handle) managed by the printer 102 from the printer 102.

Any method for associating the print job information of the print server 101 with the print job information of the printer 102 is acceptable.

When a handle for identifying a print job in the printer 102 is acquired from the printer 102, in step S803 a determination is made whether or not the setting indicates that the first print job is also to be subjected to substitute printing. In the exemplary embodiment, there are two methods for subjecting the first print job to substitute printing, manual substitution and automatic substitution. Manual substitution is a substitute printing method where a print device is specified via a user interface to perform substitute printing. Automatic substitution is a substitute printing method such that if a failure occurs in a targeted print device, another print device automatically, based on a predetermined rule, outputs the print job.

Figure 18A:
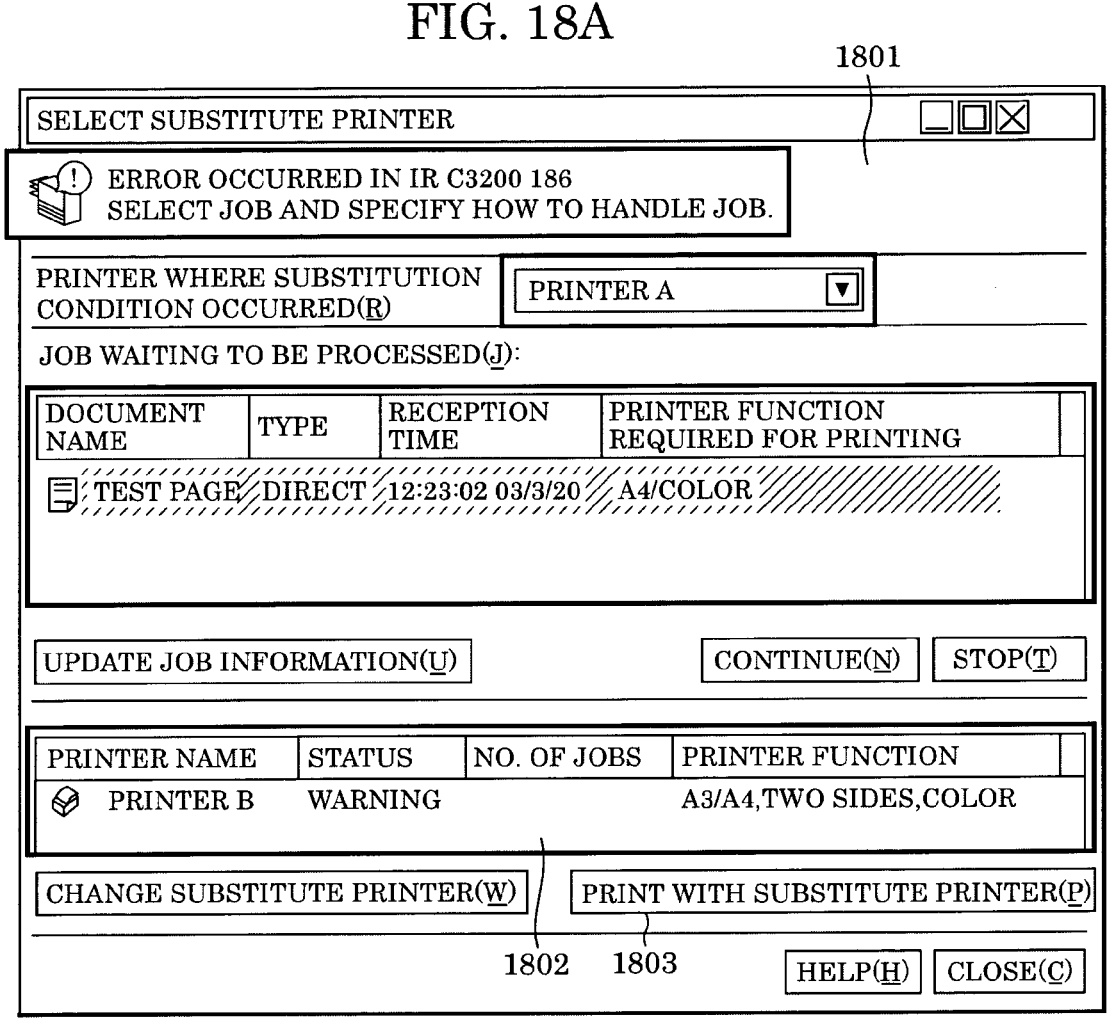
FIG. 18A is a diagram showing one example of a setting screen for detailed information display according to an embodiment.

For example, if a checkbox 1501 on the user interface shown in FIG. 15 is checked, the first print job in the print device is subjected to manual substitution. Upon selection of manual substitution, a setting screen for specifying manual substitution, as shown in FIG. 18A, is displayed. The user interface of FIG. 15 is used to set manual or automatic substitution either when a user adds a printer or when modifying printer options for a particular print job.

Returning to FIG. 8, if in step S803 it is determined that the first job is to be subjected to substitute printing, then the flow proceeds to step S804, where the status of each print job is acquired to check whether the print job can be the first print job. Then, in step S805, the handle of the first print job in the print queue of the printer 102 where a failure has occurred is identified based on the order of the print job handles in the list of the printer 102. FIG. 9, as described below, illustrates the process of identifying the handle of the first print job. When the handle of the first print job is included in the print job management information managed by the job control print service 605, for example, a mark is placed in the print job management information as shown in, for example, FIG. 10 to identify the print job as the first print job in the printer 102. In the print queue of the printer 102, print jobs are arranged in line in the order that the print jobs are transferred. Thus, for example, even in a printer of the type where a plurality of print jobs with execution-in-progress status are placed, the first print job can be identified for marking.

After the first print job is marked in step S805, in step S806 a determination is made whether or not there is a print job in the server queue of the print server 101. If it is determined that there is a print job in the server queue, then flow proceeds to step S807. If there is no print job in the server queue, then flow proceeds to step S811.

In step S807, it is confirmed whether or not the print job management information held in the print server 101 contains a mark on the first print job. If a mark on the first print job exists, the flow returns to step S806. If there is a print job to be subjected to substitute printing by another printer in the queue, the flow proceeds to step S808, where the print job in the printer is deleted. In this case, any method for enabling an individual print job to be deleted is acceptable. One example is specifying a print job handle acquired from the printer 102 to delete the print job in the printer 102. After the deletion of the print job in step S808, the deletion of the print job is confirmed in step S809. In step S809, if there is a print job whose deletion in the printer 102 has been confirmed, the flow proceeds to step S810, where the print job is transferred to the queue for scheduling a substitute printer.

Steps S806 to S810 are repeated until all print jobs, other than the first print job, that have already been transmitted to the printer 102 are transferred to the substitute queue. In other words, steps S806 to S810 are repeated until no more print jobs remain in the server queue of the print server 101. If there are no more jobs, then the flow proceeds to step S811, where the print job is transferred to the substitute printer to carry out substitute printing. Each of the print jobs transferred in step S811 corresponds to the print job that has been copied to and saved in the saving means (HD 205) when the print job was deleted in step S808.

As described above, if the determination result is NO in step S803, the processing of the flowchart in FIG. 9, as described below, showing details of step S805 is not performed, and hence all print jobs that have been issued by the print server 101 itself from among the print jobs accumulated in the printer 102 are printed by another printer (first substitution mode). On the other hand, if the determination result is YES in step S803, the processing of FIG. 9 is performed. More specifically, the print job marked as the first print job is ruled out from substitute printing. That is, from among the print jobs accumulated in the printer 102, the print jobs that have been issued by the print server 101 itself, except for the print job determined as the first print job, are printed by a different printing apparatus (second substitution mode). Furthermore, the setting of the first substitution mode and the second substitution mode can be switched by checking or un-checking checkbox 1501 in FIG. 15 or selecting a radio button 1701, 1702, or 1703 in FIG. 17. In this case, when the second substitution mode is selected, substitute printing where the function of the means for identifying the first print job is effective is carried out.

In addition, substitute printing of print jobs that have not been transmitted to the printer 102 can be carried out regardless of whether other print jobs are already scheduled in the queue of the substitute printer. In short, substitute printing can be carried out regardless of the substitute printer selection method or the existence of other print jobs in the substitute printer.

Processing for determining the first print job in step S805 of FIG. 8 will now be described in detail with reference to FIG. 9.

First, in step S902, a check is performed to determine whether the end of the list of print jobs in the printer 102 has been reached. If the end of the list has not been reached, flow proceeds to step S903, where a reference is made to the print job information acquired from the printer 102, as shown in FIG. 10. Next, in steps S904 and S905, checks are performed to determine whether the print job has a print job status that can be regarded as the first job. For example, as shown in FIG. 13, if the print job at the head of the list is being processed, job status check is performed by scanning the list starting with the print job at the head of the list. In contrast, as shown in FIG. 14, if a print job being deleted exists in the list, the print job being deleted cannot be set as the first print job.

If the results of the checks in both steps S904 and 905 are "Yes", flow proceeds to step S906. In step S906, the print job is marked (recorded) as the first print job in the print job management information. If the results of the check in either step S904 or S905 are "No", flow returns to step S902. If the first job in the list acquired from the printer 102, as shown in FIGS. 13 and 14, is a print job issued from another job control print service 605, the print job management information managed by the job control print service 605 itself does not contain management information (handle) of the corresponding job. Thus, the processing ends without recording the job as the first print job.

The present embodiment has been described by way of example where the first job is found by sequentially scanning the print jobs in the list from start to end. According to the present invention, however, any method for finding the first print job is acceptable as long as the first print job is found based on the order in the print queue of this printer 102 and the attribute information such as the print job status.

<Display in Case of Failure>

In the print system of the present invention, the host computer that transmitted the first print job is provided with visual information of a failure, whereas host computers that have not transmitted the first print job are not presented with visual failure information. Furthermore, if it is difficult to recover from a failure in the first print job, substitute printing can be carried out by switching to manual substitution with an operation on a failure report screen.

Figure 16:
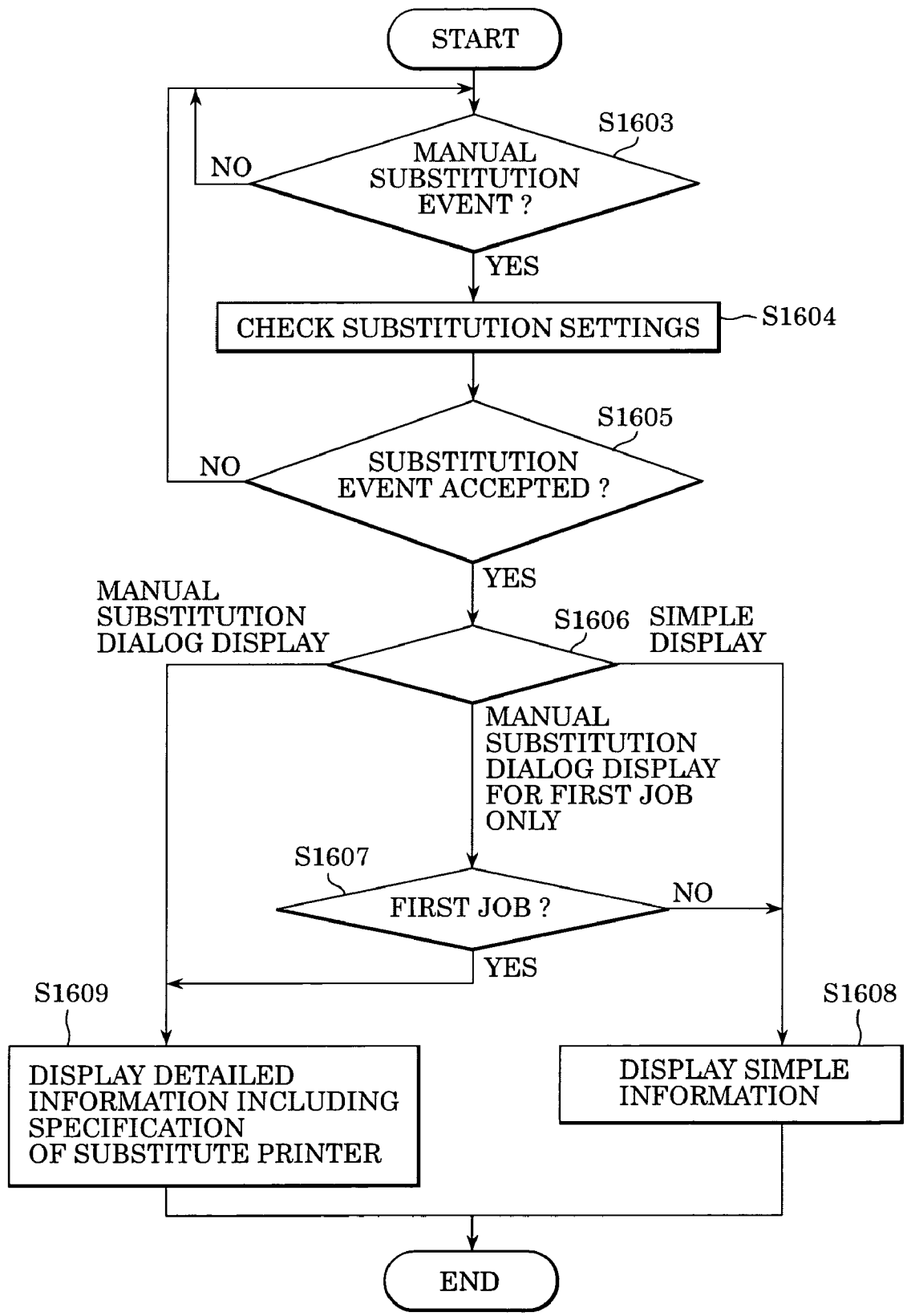
FIG. 16 is a flowchart showing the flow of processing for displaying different user interfaces depending on the setting for manual substitution display when the occurrence of manual substitution is detected, according to an embodiment.

FIG. 16 is a flowchart showing the flow of display processing carried out by the print manager 609. It is presumed that, for example, if the printer 102 is shared by a plurality of computers, the flowchart in FIG. 16 is carried out by the print manager 609 associated with the job control print service 605 operating at each computer. The print manager 609 may be included in the job control print service 605.

In step S1603, a determination is made whether or not a manual substitution event has been passed from the job control print service 605. The term "manual substitution event" indicates an event having a manual substitution condition as described above. The processing in step S1603 is repeated until a manual substitution event occurs.

The confirmation in step S1603 may be made based on voluntary event notification to the print manager 609 from the job control print service 605 or based on the status acquired by polling from the print manager 609 to the job control print service 605. Furthermore, if the print manager 609 is included in the job control print service 605, the confirmation in step S1603 may be made based on voluntary status event notification from the printer 102 or based on the status acquired by polling from the job control print service 605 to the print device.

As described above, the use of both polling and event notification enables the occurrence of manual substitution conditions to be detected more reliably.

When a manual substitution event is detected in step S1603, the flow proceeds to step S1604, where the display setting preset for the print queue that has generated the manual substitution event is acquired. For example, in the user interface shown in FIG. 17, whether a manual substitution event is to be accepted is set according to which of the radio buttons 1701 and 1702 is selected. Furthermore, if a manual substitution event is to be accepted, one of three options: "DISPLAY MANUAL SUBSTITUTION ICON ONLY", "AUTOMATICALLY DISPLAY MANUAL SUBSTITUTION DIALOG", or "AUTOMATICALLY DISPLAY DIALOG ONLY FOR FIRST JOB IN DEVICE" can be specified by selecting the corresponding radio button 1703.

Figure 17:
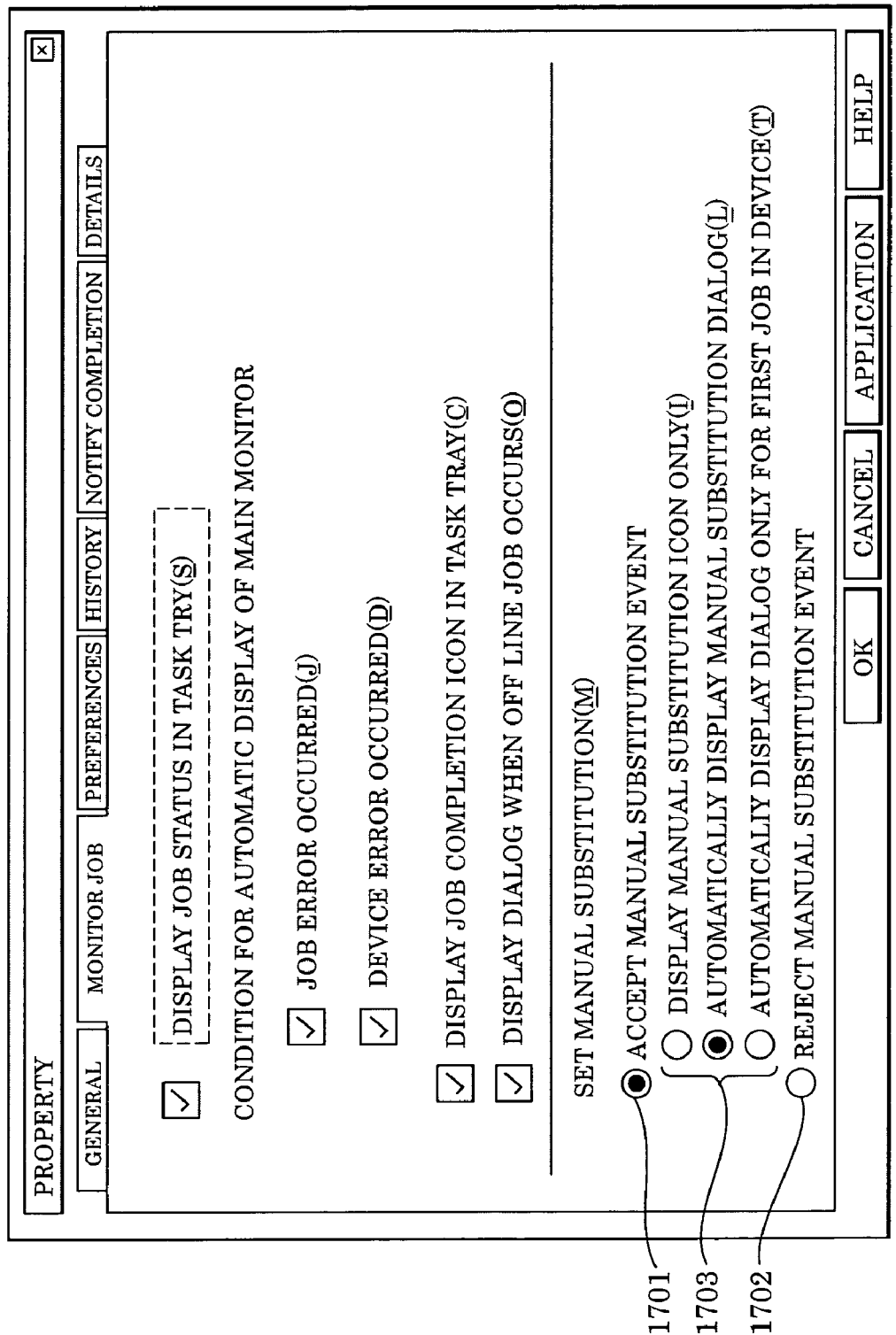
FIG. 17 is a diagram showing one example of a setting screen for manual substitution display only for the first job in a device according to an embodiment.

If a failure such as paper out occurs in the printer 102, the occurrence of the manual substitution event is reported to the print manager 609 from the job control print service 605. Then, in step S1605, a determination is made, based on the above-described settings, whether the manual substitution event is to be accepted. The settings in FIG. 17 are made in response to notification from the job control print service 605 in the print manager 609 shown in FIGS. 6A and 6B. The settings in FIG. 17 may also be made in response to the operation of the job control print service 605 based on the status notification acquired from the printer 102 by including the print manager 609 in the job control print service 605.

Referring back to FIG. 16, if the setting specifying a manual substitution event is not accepted in step S1605, the flow returns to step S1603 to wait for a manual substitution event. If, however, the setting specifying a manual substitution event is accepted, the flow proceeds to step S1606.

In step S1606, which radio button is selected is determined by referring to the radio buttons 1703 in FIG. 17. If the radio button "AUTOMATICALLY DISPLAY DIALOG ONLY FOR FIRST JOB IN DEVICE" is selected, the flow proceeds to step S1607, where whether the print job associated with the manual substitution event is the first print job is determined from the type of the manual substitution event or additional information. If the print job associated with the manual substitution event is not the first print job, the print job is not a print job disabling the subsequent print jobs to be printed out.

Figure 18B:
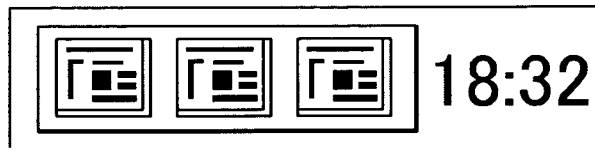
FIG. 18B is a diagram showing one example of a setting screen for simple information display according to an embodiment.

Therefore, the UI prompting manual substitution is not displayed, and just a simple UI (not shown) is displayed in step S1608. More specifically, the manual substitution dialog is not displayed, and the printer status is displayed as an icon in the task tray, as shown in FIG. 18B. If a predetermined command is issued to the simple display shown in FIG. 18B, the setting screen in FIG. 18A can be displayed instead of the display in FIG. 18B.

If, in step S1607, it is determined that the print job in question is the first print job based on the manual substitution event, the flow proceeds to step S1609, where detailed information including, for example, the specification of a substitute printing destination, as shown in FIG. 18A, is displayed to report the occurrence of a failure in the print job to the owner of the first print job. A mechanism for determining whether or not the first print job in the list (FIGS. 13 and 14) acquired from the printer 102 is a print job issued by the job control print service 605 itself has already been previously described with reference to FIGS. 7 to 9 and FIG. 12.

If, in step S1606, simple display with icon only is set, simple information display is carried out in step S1608 regardless of whether the print job in question is the first print job. The simple information display here corresponds to, for example, the display shown in FIG. 18B. If the setting that the manual substitution dialog is displayed is selected in step S1606, the flow proceeds to step S1609, where a detailed information screen 1801 shown in FIG. 18A is displayed.

A predetermined substitute printer is selected according to a user instruction from a list 1802 shown in FIG. 18A. When a command for performing substitute printing is issued to the selected printer by selecting a button 1803 shown in FIG. 18A, the saved print job is transferred to the selected printer.

As described above, because the setting specifying that a detailed dialog is displayed only for the first print job in a printer is allowed, the owner of the first print job involving a failure is not only prompted to carry out manual substitution, but also is informed of a detailed report about its own print job causing the printer to be suspended. Furthermore, owners of print jobs not involving a failure in the first print job do not receive detailed visual information on the desktop, unlike the owner of the first print job involving the failure. That is, for such owners not involving a failure, a minimum required simple display is presented only to indicate that their jobs are printed by another printer. In short, complicated display is not performed for such owners.

In a print system employing a partial substitute printing method where the printing apparatus has a function for reporting the completion of printing to the host computer in units of pages or impressions and the host computer has a printing apparatus carry out printing from the ejected page, from the page subsequent to the number of impressions, or from the impression, there is a problem in that the document of a print job which is printed by another printing apparatus while it is being processed has a difference in print format, such as variations in print positions and differences in hue, due to differences between the printing apparatuses, although a problem of duplicate printing does not occur. According to the above-described embodiments, this problem is solved.

Furthermore, problems presented by print jobs that need to be printed out by the same printing apparatus, such as a print job for bookbinding or stapling, can also be solved by the above described embodiments.

Furthermore, a print system where the host computer transmits one print job at a time to a printing apparatus has a problem in that the printing apparatus takes a long time to perform continuous printing because an engine idle time is created during print job transfer and data development on the first page, although a problem of duplicate printing is moderated at the time of substitute printing. This problem can also be overcome by the above described embodiments.

In addition to enabling short-time printing, the print job being processed by the engine can be identified by acquiring the status of print jobs in the device to prevent duplicate printing. For example, in a typical printing apparatus which, when a plurality of print jobs are received, starts the processing (e.g., interpretation of PDL, Job Language, development of image data on the first page, etc.) of print jobs subsequent to the first print job before paper eject of the first print job is completed, the statuses of print jobs in the device acquired from the host computer only indicate that a plurality of print jobs are being processed. In other words, in such a typical printing apparatus, a status alone is not sufficient to identify print jobs for which the print engine is still working and for which paper eject has not been completed in some cases. According to the present invention, however, this problem is overcome.

Other Embodiments

The present invention may be applied to an apparatus including a plurality of devices and to an apparatus including a single device. In addition, the present invention may be realized by directly or remotely supplying a system or an apparatus with a software program, i.e., computer-executable process steps, for realizing the function of the above-described embodiment, and then having the computer of the system or the apparatus read and execute the supplied program code. For this purpose, any entity functioning as a program is acceptable.

Therefore, the program code itself installed in a computer to realize the functional processing of the present invention on the computer is also covered by the present invention. In short, a computer program itself for realizing the functional processing of the present invention is included in a claim of the present invention. In this case, any form of program, including a program executed as object code or by an interpreter and script data supplied by an OS is acceptable, as long as it functions as a program.

The recording medium for supplying the program code includes a floppy disk, a hard disk, an optical disk, a magneto-optical disk, an MO, a CD-ROM, a CD-R, a CD-RW, a magnetic tape, a non-volatile memory card, a ROM, and a DVD (DVD-ROM and DVD-R).

Such a program may be supplied by accessing a home page on the Internet with a browser of a client computer and then downloading from the home page into a recording medium, such as a hard disk, the computer program itself according to the present invention or a compressed file of the program including an automatic installation function. Furthermore, the present invention can also be realized by dividing the program code constituting the program according to the present invention into a plurality of files, and downloading each of the files from different home pages. In other words, an Internet server for allowing a plurality of users to download program files for realizing functional processing according to the present invention into a computer is included in a claim of the present invention.

In addition, the present invention can also be realized by supplying a user with a recording medium, such as a CD-ROM, storing an encrypted version of the program according to the present invention, allowing only a user satisfying predetermined conditions to download key information for decrypting the encrypted program from a home page via the Internet, and executing the encrypted program with the key information to install the program into the computer.

As described above, the function of the above-described embodiment is achieved with the execution of the program code read by the computer. In addition, the function of the above-described embodiment may also be achieved by, for example, the OS running on the computer that performs all or part of the processing according to the commands of the program code.

Furthermore, the function of the above-described embodiment may also be achieved such that the program code read from a recording medium is written to a memory provided in an expansion card disposed in the computer or an expansion unit connected to the computer, and then, for example, the CPU provided on the expansion card or the expansion unit performs all or part of the processing based on commands in the program code.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-412210 filed Dec. 10, 2003, which is hereby incorporated by reference herein.

What is claimed is:

1. An information processing apparatus which can communicate with a plurality of printing apparatuses, comprising:
   a detection unit that detects in one printing apparatus an occurrence of an event in which printing is disabled;
   a first identification unit that identifies, in response to detection performed by the detection unit, print jobs which are issued by the information processing apparatus among a plurality of print jobs managed by a print queue of the printing apparatus;
   an obtaining unit that obtains information indicating a status of each of the print jobs in the printing apparatus;
   a second identification unit that identifies, in response to detection performed by the detection unit, a first print job which is to be processed first and print jobs other than the first print job from among the plurality of print jobs managed by the print queue of the printing apparatus, based on the information indicating a status of each of the print jobs in the printing apparatus;
   a transfer unit that transfers, in response to detection performed by the detection unit, the print jobs other than the first print job and identified by the first identification unit from among the plurality of print jobs to another printing apparatus without transferring the first print job and the print job not being identified by the first identification unit to the another printing apparatus;
   a deletion unit that deletes, in response to detection performed by the detection unit, the print jobs other than the first print job and identified by the first identification unit from among the plurality of print jobs from the printing apparatus while leaving the first print job in the printing apparatus; and
   a selection unit that selects via a setting screen, a first substitution mode in which all print jobs which are identified by the first identification unit are printed by another printing apparatus in place of the printing apparatus or a second substitution mode in which print jobs, other than the first print job, which are identified by the first identification unit are printed by another printing apparatus in place of the printing apparatus, wherein the second identification unit functions when the second substitution mode is selected.

2. The information processing apparatus according to claim 1, further comprising a saving unit that saves a copy of a print job transferred to the printing apparatus, wherein the transfer unit transfers the copy of the print job saved in the saving unit to the other printing apparatus.

3. The information processing apparatus according to claim 1, wherein, when the print job to be processed first is being deleted, the second identification unit identifies a print job to be processed following the print job being deleted as the first print job.

4. The information processing apparatus according to claim 1, further comprising an acquisition unit that acquires a list of print jobs from the printing apparatus, wherein the second identification unit identifies the first print job based on the list acquired by the acquisition unit.

5. The information processing apparatus according to claim 4, wherein the list includes information indicating a status of each of the print jobs, and wherein the second identification unit determines whether the print job to be processed first is being deleted based on the information indicating the status, and when the print job to be processed first is being deleted, the second identification unit identifies a print job to be processed following the print job being deleted as the first print job.

6. The information processing apparatus according to claim 4, further comprising a management unit that manages a print job issued by the information processing apparatus, wherein the second identification unit identifies whether the issued print job is the first print job, and wherein the information processing apparatus further comprises a display control unit that performs manual substitution printing display when the second identification unit identifies the issued print job as the first print job.

7. An information processing system which can communicate with a plurality of printing apparatuses, the system comprising:
   detection means for detecting in one printing apparatus the occurrence of an event in which printing is disabled;
   first identification means for identifying, in response to detection performed by the detection means, print jobs which are issued by the information processing apparatus among a plurality of print jobs managed by a print queue of the printing apparatus;
   second identification means for identifying, in response to detection performed by the detection means, a first print job which is to be processed first and print jobs other than the first print job from among the plurality of print jobs managed by the print queue of the printing apparatus;
   transfer means for transferring, in response to detection performed by the detection means, the print jobs other than the first print job and identified by the first identification means from among the plurality of print jobs to another printing apparatus without transferring the first print job and the print job not identified by the first identification unit to the other printing apparatus;
   deletion means for deleting, in response to detection performed by the detection means, the print jobs other than the first print job and identified by the first identification means from among the plurality of print jobs from the printing apparatus while leaving the first print job in the printing apparatus; and selection means for selecting, via a setting screen, a first substitution mode in which all print jobs which are identified by the first identification means are printed by another printing apparatus in place of the printing apparatus or a second substitution mode in which print jobs, other than the first print job, which are identified by the first identification means which are printed by another printing apparatus in place of the printing apparatus, wherein the second identification means functions when the second substitution mode is selected.

8. A method for managing print jobs in a plurality of printing apparatuses, the method comprising:

a detection step of detecting in one printing apparatus the occurrence of an event in which printing is disabled;

a first identification step of identifying, in response to detection performed by the detection means, print jobs which are issued by the information processing apparatus among a plurality of print jobs managed by a print queue of the printing apparatus;

a second identification step of identifying, in response to detection performed in the detection step, a first print job which is to be processed first and print jobs other than the first print job from among the plurality of print jobs managed by the print queue of the printing apparatus;

a transfer step of transferring, in response to detection performed in the detection step, the print jobs other than the first print job and identified by the first identification step from among the plurality of print jobs to another printing apparatus without transferring the first print job and the print job not identified by the first identification unit to the another printing apparatus;

a deletion step of deleting, in response to detection performed in the detection step, the print jobs other than the first print job and identified by the first identification step from among the plurality of print jobs from the printing apparatus while leaving the first print job in the printing apparatus; and a selection step for selecting, via a setting screen, a first substitution mode in which all print jobs which are identified by the first identification step are printed by another printing apparatus in place of the printing apparatus or a second substitution mode in which print jobs, other than the first print job, which are identified by the first identification step which are printed by another printing apparatus in place of the printing apparatus, wherein the second identification step functions when the second substitution mode is selected.

9. The method according to claim 8, further comprising a saving step of saving a copy of a print job transferred to the printing apparatus, wherein, in the transfer step, the copy of the print job saved in the saving step is transferred to the other printing apparatus.

10. The according to claim 8, wherein, in the identification step, when the print job to be processed first is being deleted, a print job to be processed following the print job being deleted is identified as the first print job.

11. The method according to claim 8, further comprising an acquisition step of acquiring a list of print jobs from the printing apparatus, wherein, in the second identification step, the first print job is identified based on the list acquired in the acquisition step.

12. The method according to claim 11, wherein the list includes information indicating a status of each of the print jobs, and wherein the second identification step determines whether the print job to be processed first is being deleted based on the information indicating the status, and when the print job to be processed first is being deleted, the second identification step identifies a print job to be processed following the print job being deleted as the first print job.

13. The method according to claim 11, further comprising a management step of managing a print job issued by the information processing apparatus, wherein the second identification step identifies whether the issued print job is the first print job, and wherein the method further comprises a display control step of performing manual substitution printing display when the issued print job is identified in the second identification step as the first print job.

14. The method according to claim 8, further comprising a selection step of selecting a first substitution mode in which all print jobs that have been issued to the printing apparatus are printed by another printing apparatus in place of the printing apparatus or a second substitution mode in which print jobs, other than the first print job, that have been issued to the printing apparatus are printed by another printing apparatus in place of the printing apparatus, wherein the second identification step functions when the second substitution mode is selected.

15. A computer-readable storage medium storing a program for managing print jobs in a plurality of printing apparatuses, the program causing a computer to executed the method of claim 8.

* * * * *